US006347933B1

(12) United States Patent
Pscherer

(10) Patent No.: US 6,347,933 B1
(45) Date of Patent: Feb. 19, 2002

(54) ECCENTRIC PRESS

(76) Inventor: Manfred Pscherer, Rosenstr. 4, D-91244 Reichenschwand (DE)

( * ) Notice: Subject to any disclaimer, the term of this patent is extended or adjusted under 35 U.S.C. 154(b) by 0 days.

(21) Appl. No.: 09/426,010

(22) Filed: Oct. 25, 1999

(51) Int. Cl.[7] ................................................ B29C 43/32
(52) U.S. Cl. .......................... 425/78; 425/352; 425/354
(58) Field of Search .......................... 425/78, 352, 356, 425/406

(56) References Cited

U.S. PATENT DOCUMENTS 3,566,442 A * 3/1971 Hakala ........................ 452/78
3,567,929 A * 3/1971 White ........................ 425/157
3,836,299 A * 9/1974 Houston et al. ............ 425/128
4,662,234 A * 5/1987 Yokoyama et al. ........... 425/78
5,566,373 A * 10/1996 Seimetz et al. ............. 425/352

* cited by examiner

*Primary Examiner*—Robert Davis
*Assistant Examiner*—Thu Khanh T. Nguyen
(74) *Attorney, Agent, or Firm*—Thomas R. Vigil

(57) ABSTRACT

The eccentric press for pressing of machined parts out of powdery material using a drawing-off procedure, comprises a driving motor, an actuation for an eccentric pinion gear with a worm drive shaft as well as at least two columns, one tie-bar and a press mechanism with a pressing mold, wherein the motor (2) is accommodated in front of, above or in the vertical axis beside the worm drive shaft (3) and wherein the oil pump (6) is essentially arranged on the same level as the worm drive shaft (3).

5 Claims, 1 Drawing Sheet

ECCENTRIC PRESS

BACKGROUND OF THE INVENTION

1. Field of the Invention

The present invention relates to an eccentric press for pressing of machined parts out of powdery material using a drawing-off procedure, comprising a driving motor, an actuation for an eccentric pinion gear with a worm drive shaft as well as at least two columns, one tie-bar and the press mechanism with the pressing mould. The motor is accommodated in front of, above or in the vertical axis beside the worm drive shaft and an oil pump is essentially arranged on the same level as the worm drive shaft.

2. Description of the Prior Art

Eccentric presses for pressing of machined parts out of powdery material using a drawing-off procedure are well known in the art. These eccentric presses comprise a driving motor, an actuation for the eccentric pinion gear with worm drive shaft as well as at least two columns, one tie-bar and the press mechanism with the pressing mould. The presses known from the state of the art were built of three housing parts, a lower housing accommodating the motor responsible for the actuation whereas a central and upper housing were receiving the press mechanism and particularly the eccentric drive. Presses with a pressing range of less than 8 tons, which may be installed in a relative mobile way, were so high that service resting places or stairs with landing place had to be provided for the staff. This did not contribute to render the operation economical. In these known constructions, the electrically driven oil pump was arranged either on the outer side of the lower housing, or vertically in the lower and central housing. The same occurred with the maintenance unit for supplying compressed air, the oil filter and the safety valve for the press.

SUMMARY OF THE INVENTION

The object of the present invention is to provide an eccentric press of a much more compact design by changing the location of the different component parts, so that resting places for the staff are no longer necessary.

The solution of this object is achieved by providing an eccentric press for pressing of machined parts out of powdery material using a drawing-off procedure, comprising a driving motor, an actuation for an eccentric pinion gear with a worm drive shaft as well as at least two columns, one tie-bar and the press mechanism with the pressing mould and wherein the motor is accommodated in front of, above or in the vertical axis beside the worm drive shaft and an oil pump is essentially arranged on the same level as the worm drive shaft.

According to the invention, an eccentric press for pressing of machined parts out of powdery material using a drawing-off procedure, comprising a driving motor, an actuation for the eccentric pinion gear with worm drive shaft as well as at least two columns, one tie-bar and the press mechanism with the pressing mould, is characterized in that the motor is accommodated in front of, above or in the vertical axis beside the worm drive shaft and that the oil pump is essentially arranged on the same level as the worm drive shaft. The maintenance unit for supplying compressed air, the oil filter and/or the safety valve for the press are preferably accommodated in the vicinity of the oil pump.

The motor shaft is directly connected to the worm drive shaft via a coupling part, or the actuation induced by the motor shaft is transmitted to the worm drive shaft via a belt or a chain drive. According to a particularly advantageous embodiment of the invention, the driving side of the motor is directed towards the driving wheel of the worm drive shaft. By this rotation through 180° compared to the arrangements of the art, a press of low design may be obtained, whereas the worm drive shaft and the oil pump, as well as the oil filter, the safety valve for the press and the maintenance unit for supplying compressed air are all accommodated in a common housing part.

DESCRIPTION OF THE PREFERRED EMBODIMENT(S)

Figure 1:
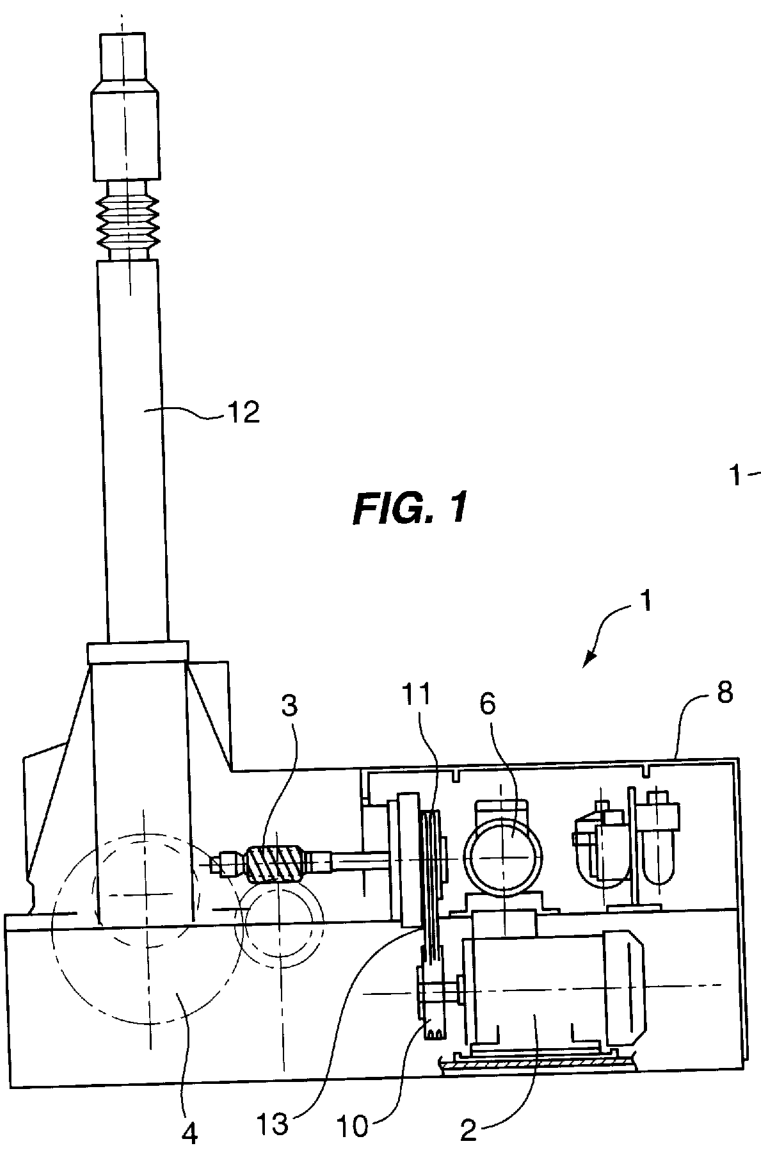
FIGS. 1–3 show three different views of an eccentric press with a housing arrangement according to the invention.
Figure 2:
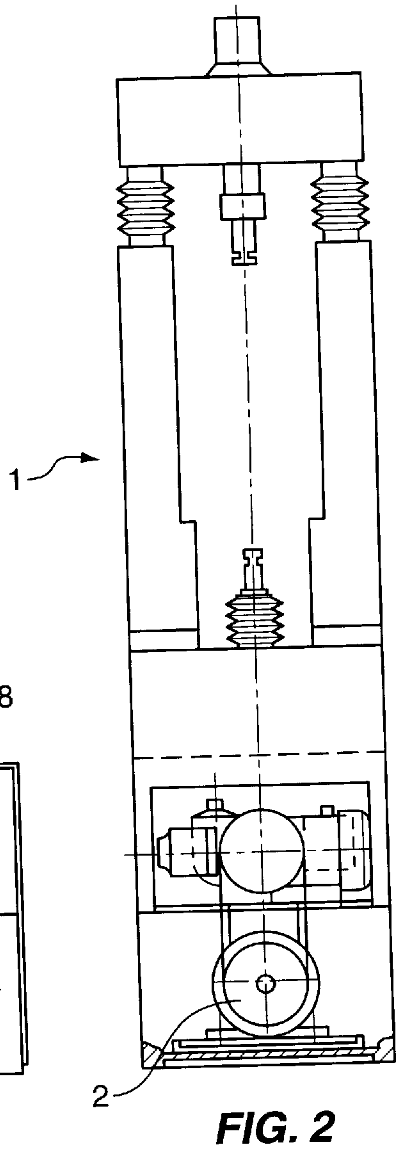
Figure 3:
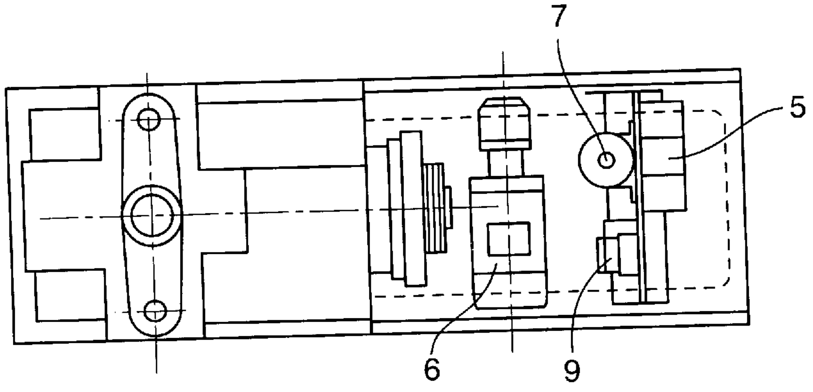

The eccentric press 1 comprises an upper press part 12, which has a traditional design and which therefore will not be described, and of a two-parted press housing 8. An electric driving motor 2 is arranged on the floor of the press housing 8. The driving motor 2 actuates a worm drive shaft 3 via a driving wheel 10, a driving belt 13 and via another driving wheel 11. The worm drive shaft 3 cooperates with an eccentric drive. This does not need any description. The arrangement of the driving motor 2 differs from the constructions of the art in that it is located in front of the worm drive shaft and that its drive shaft is directed towards said worm drive shaft. Since the driving motor 2 is not completely placed underneath the worm drive shaft, the overall height of the housing 8 may be reduced. The housing 8 is somewhat longer than the housings of the art and receives, above the driving motor 2, in an upper housing part the oil pump 6, the oil filter 7, the maintenance unit 5 for supplying compressed air as well as the safety valve for the press 9. The lower housing used in the presses of the art has been omitted in this arrangement. A considerably lower design can thus be achieved.

I claim:

1. An eccentric press for pressing of machined parts out of powdery material using a drawing-off procedure, comprising a driving motor, an oil pump, an actuation for an eccentric pinion gear with a worm drive shaft as well as at least two columns, one tie-bar and a press mechanism with a pressing mould, and wherein the motor (2) is accommodated in front of, above or in a vertical axis beside the worm drive shaft (3) and wherein the oil pump (6) is substantially arranged on the same level as the worm drive shaft (3).

2. The eccentric press according to claim 1, further including a maintenance unit (5) for supplying compressed air and wherein the maintenance unit (5) for supplying compressed air, the oil filter (7) and a safety valve for the press (9) are arranged so as to lie generally on the same level as said oil pump.

3. The eccentric press according to claim 1, wherein the motor shaft is directly connected to the worm drive shaft (3) via a coupling part.

4. The eccentric press according to claim 1, wherein the actuation induced by the motor shaft is transmitted to the worm drive shaft (3) via a belt or a chain drive (13), and wherein a driving side of the motor (2) is directed towards the driving wheel (11) of the worm drive shaft (3).

5. The eccentric press according to claim 1 wherein the worm drive shaft (3) and the oil pump (6) are arranged in a common housing part.

* * * * *